March 2, 1926.
J. M. MILLER
DIRECTION INDICATOR SWITCH
Filed August 23, 1922
1,575,446
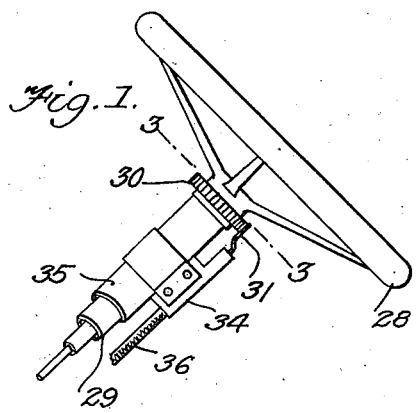
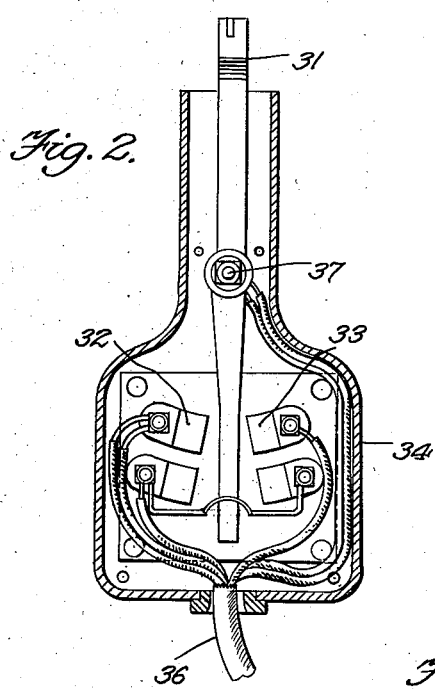
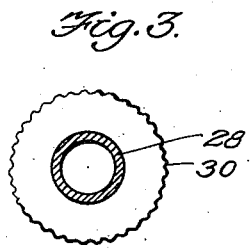
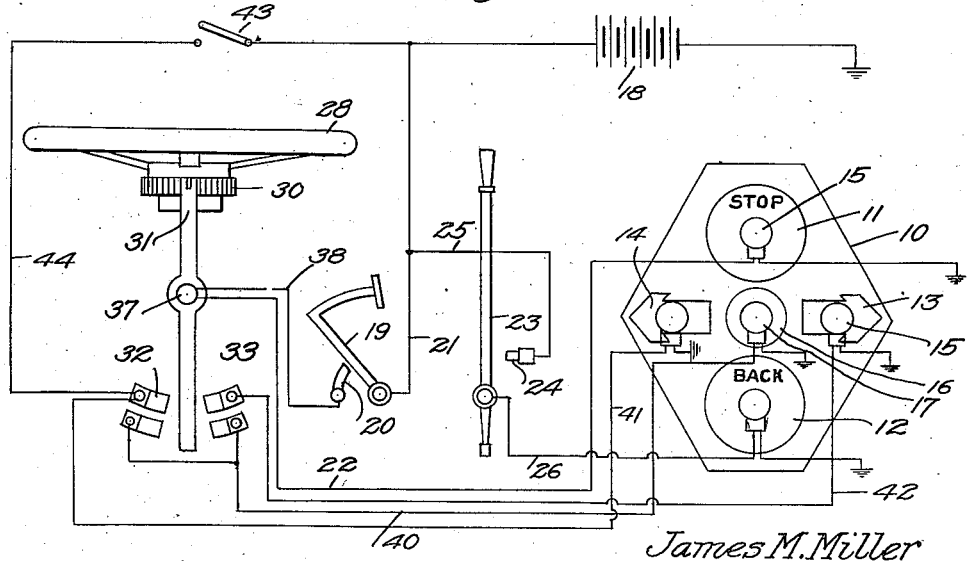
James M. Miller
INVENTOR
BY Victor J. Evans
ATTORNEY
WITNESS:

Patented Mar. 2, 1926.

1,575,446

UNITED STATES PATENT OFFICE.

JAMES M. MILLER, OF WASHINGTON, DISTRICT OF COLUMBIA, ASSIGNOR TO MILLER AUTOMATIC SIGNAL LIGHT COMPANY, OF WASHINGTON, DISTRICT OF COLUMBIA, A CORPORATION OF DELAWARE.

DIRECTION-INDICATOR SWITCH.

Application filed August 23, 1922. Serial No. 583,875.

*To all whom it may concern:*

Be it known that I, JAMES M. MILLER, a citizen of the United States, residing at Washington, in the District of Columbia, have invented new and useful Improvements in Direction-Indicator Switches, of which the following is a specification.

This invention relates to direction signals for motor operated vehicles, and embodies amongst other features, the provision of means whereby certain compartments of a lamp casing mounted at the rear of the vehicle, are selectively illuminated incident to the turn of the steering wheel and a slight movement of the brake pedal, the said compartments being illuminated when the play of the steering wheel is taken up, and just prior to turning the front wheels of the vehicle, thereby giving drivers of other machines ample notice of the fact that the driver of the machine with which the signal is equipped is about to turn in either direction.

Another object of the invention resides in the provision of a signal of the above mentioned character whereby a particular compartment of the lamp casing is illuminated incident to the depression of the brake pedal, to indicate the intention of the driver of the vehicle to bring his car to a stop; while an additional compartment of the lamp casing is automatically illuminated when the gear shift lever is moved in a proper direction to place the car in reverse gear, which indicates to others, that the driver of the vehicle is about to reverse his machine.

A further object of the invention resides in the provision of a direction signal whereby one of the compartments of the lamp casing which is illuminated to indicate to others the intention of the driver to turn in either direction as above stated, is also used in the capacity of a parking lamp.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:—

Figure 1 is a fragmentary view of a steering column and post, showing the application of the switch thereto.

Figure 2 is a view in elevation of the switch.

Figure 3 is a sectional view taken on line 3—3 of Figure 1.

Figure 4 is a diagrammatic view.

Referring to the drawing in detail, 10 indicates a lamp casing which is adapted to be arranged at some appropriate part of the vehicle, and which casing is provided with compartments 11, 12, 13, and 14 respectively. The cover of the casing is provided with openings. Arranged directly at the rear of these compartments and the openings are the compartments 13 and 14, which are substantially arrow-shaped, pointing to the right and to the left. Each compartment is provided with an electric light bulb 15, it being understood that the compartments are singly illuminated to convey certain information to the drivers of other vehicles, relative to the stopping of the machine, or the course it is about to pursue. For this purpose, the word "Stop" appears on the transparent member arranged in the opening for the compartment 11, while the word "Back" is similarly arranged with relation to the compartment 12. In the center of the casing 10 there is an additional compartment 16 which contains an electric light bulb 17, and when this compartment is illuminated, it illuminates the transparent member which is adapted to cover the opening in the cover of the casing, and this transparent member is of a different color than any of the similar members above referred to. It is to be understood that this central compartment 16 is illuminated just prior to either of the compartments selectively illuminated to indicate which way the vehicle is to be turned.

When the electric light bulbs in the different compartments are connected in different circuits, and the source of energy for these circuits is indicated at 18, the bulb 15 in the compartment 11 is connected in circuit with the brake pedal 19, so that when the brake pedal is slightly depressed and brought into engagement with a contact 20, the current flows from the battery through the wires 21 and 22 respectively to the said compartment, illuminating this compartment 11 and indicating that the driver is about to stop his vehicle. The bulb in the compartment 12 is connected in circuit with the gear shift lever, so that when this lever 23 is shifted to place the car in reverse gear, it engages a contact 24, current flowing through the wires 21, 25 and 26 to the compartment 12 illuminating the latter, so that others are informed of the fact that the driver is about to reverse his machine.

As above stated, the compartments 13 and 14 respectively are selectively illuminated incident to the turning of the steering wheel 28, to indicate which direction the machine is about to turn. For this purpose, the steering post 29 is provided with a toothed wheel 30 which is arranged immediately beneath the steering wheel 28, and this toothed wheel is engaged by the adjacent extremity of the movable element 31 of a switch which operates between spaced pairs of contacts 32 and 33 respectively. The movable contact element 31 and the contacts 32 and 33 are all arranged in a suitable housing or casing 34 which is also clamped or mounted upon the steering column 35, and the various wires associated with these parts are arranged in a single tubing or the like 36 which enters the casing 34 through an opening in the bottom thereof. The movable contact element or member 31 has its upper portion extended from the housing or casing 34 and inset. The upper end of the movable contact element or member 31 is bifurcated and engaged by the toothed wheel 30. When the steering wheel is turned to the left, that is when it is initially turned to take up the lost motion in the wheel, the teeth on the wheel 30 engaging the adjacent end of the movable contacting element 31, shifts the latter on its pivot 37, moving it into engagement with the contacts 32. The brake pedal 19 is then depressed, and moved into engagement with the contact 20, completing the circuit to the compartment 13. The current flows from its source 18 through the wire 21, thence through the brake pedal and contact 20, to the element 31 through the wire 38, and thence through the contacts 32 to the compartment 13. This compartment is illuminated to indicate that the driver is about to turn to the left, and when the element 31 has been moved into engagement with the contacts 32, further turning of the steering wheel 28 in order to guide the vehicle will not disturb the element 31, as it then merely idles over the teeth of the wheel 30. It will be also noted that when the contact element 31 is moved into engagement with the contacts 32, which engages one of the contacts just prior to the other, so that when the pedal 19 is depressed to complete the circuit, the compartment 16 is illuminated immediately before the compartment 13, the current passing through the wire 40 to the compartment 16. When the steering wheel 28 is turned to the right, the operation of the element 31 is just reversed, that is it is moved into engagement with the contacts 33, to illuminate the compartments 16 and 14 respectively. The current flows through the brake pedal 19, and wire 38 to the movable element 31 and thence through the contacts 33 to the said compartments. A conducting wire 41 leads to the compartment 14, while a conducting wire 42 leads to the compartment 16.

When the vehicle is brought to a stop, the switch 43 is operated to illuminate the compartment 14 which is then used in the capacity of a parking lamp; the current flows to the wire 44 from the source of energy 18 to one of the contacts 33, and thence from said contact to the wire 41 to said compartment.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

1. A switch attachment for use in direction signalling for motor vehicles comprising the combination with the steering column of the steering mechanism of the vehicle, a steering rod wheel, and a toothed wheel carried by said steering wheel and operating when the steering wheel is shifted to take up lost motion prior to steering, of a switching mechanism supported from said column in proximity to said steering wheel and including a pivoted circuit opening and closing member having an inset upper end permanently engaging with said toothed wheel whereby said member is shifted to circuit closing position when the steering wheel is actuated to take up lost motion.

2. A switch attachment for use in direction signalling for motor vehicles comprising the combination with the steering column of the vehicle, a steering rod wheel, and a toothed wheel carried by the hub of the steering wheel and operated when the latter is shifted to take up lost motion prior to steering, of a switch mechanism supported from said column in proximity to said steering wheel and including a pivoted circuit opening and closing member having its upper end permanently in engagement with said toothed wheel whereby said member is shifted by the toothed wheel to circuit closing position when the steering wheel is actuated to take up lost motion, and means whereby the circuit closed by said member is controlled from the brake lever of the vehicle.

In testimony whereof I affix my signature.

JAS. M. MILLER.